United States Patent
Higgins

(10) Patent No.: US 6,428,834 B1
(45) Date of Patent: Aug. 6, 2002

(54) SELF-CONTAINED MOBILE SYSTEM AND METHOD FOR SELECTIVELY PROCESSING FRESH CORN

(75) Inventor: David W. Higgins, Lowell, AR (US)

(73) Assignee: Razorback Farms, Inc., Springdale, AK (US)

( * ) Notice: Subject to any disclaimer, the term of this patent is extended or adjusted under 35 U.S.C. 154(b) by 0 days.

(21) Appl. No.: 10/042,472

(22) Filed: Jan. 9, 2002

Related U.S. Application Data

(63) Continuation of application No. 09/887,584, filed on Jun. 22, 2001, now abandoned.

(51) Int. Cl.$^7$ .............................. A23L 1/00; A23N 7/00
(52) U.S. Cl. .................... 426/482; 99/537; 99/540; 99/546; 99/643; 241/7; 241/9; 241/23; 241/101.76; 426/518
(58) Field of Search ................. 426/479, 481, 426/482, 484, 518; 99/537, 540, 546, 635, 643; 241/7, 9, 23, 101.76

(56) References Cited

U.S. PATENT DOCUMENTS

| | | | |
|---|---|---|---|
| 2,085,051 A | * | 6/1937 | Taylor .......................... 99/540 |
| 2,511,960 A | | 6/1950 | Andrews |
| 3,393,723 A | | 7/1968 | Blanshine |
| 3,396,767 A | | 8/1968 | Blanshine et al. |
| 3,670,972 A | | 6/1972 | Quinn |
| 3,948,451 A | | 4/1976 | Pecis |
| 4,327,616 A | * | 5/1982 | Klukis .......................... 99/643 |
| 4,577,805 A | | 3/1986 | Seymour |
| 4,816,277 A | * | 3/1989 | Frankstein et al. .......... 426/482 |
| 5,884,853 A | | 3/1999 | Higgins |

OTHER PUBLICATIONS

David Higgins, "Letter to Monty L. Ross, dated Apr. 11, 1997,".
David Higgins, "Letter to Monty L. Ross, dated Aug. 18, 1997,".

* cited by examiner

Primary Examiner—George C. Yeung
(74) Attorney, Agent, or Firm—Locke Liddell & Sapp LLP; Monty L. Ross

(57) ABSTRACT

A mobile system for processing raw ears of corn includes a first mobile processing trailer for receiving raw unhusked ears of corn, holding the ears and disbursing them to a husker for removing corn husks and corn silk from the ears. A conveyer takes the husked ears of corn to a second trailer for further processing. The second mobile processing trailer includes multiple cutting machines to remove the corn kernels from the cob and a saw to slice the fresh ears of corn into mini cobs. A conveyer takes the sliced cobs to a holding bin for transportation to a cannery while a second conveyer removes the corn kernels from the second trailer to a third trailer for washing and cooling. The third trailer includes a pair of rotating sieves and a cooling tank to clean and chill the corn kernels. The chilled kernels are then transported via a conveyer to transportation receptacle for transportation to a cannery for further processing.

35 Claims, 4 Drawing Sheets

continuation content …

SELF-CONTAINED MOBILE SYSTEM AND METHOD FOR SELECTIVELY PROCESSING FRESH CORN

CROSS REFERENCE TO RELATED APPLICATION

This application is a continuation of U.S. application Ser. No. 09/887,584, filed Jun. 22, 2001 now abandoned.

TECHNICAL FIELD

The present invention relates generally to a system and method for processing fresh corn and in particular to a self-contained mobile processing plant for processing fresh corn in proximity to the field in which it is grown.

BACKGROUND OF THE INVENTION

In the prior art, fresh ears of corn have been typically processed by harvesting the corn in the field with standard prior art corn strippers and then transporting corn to central canneries where the corn is processed and packaged as cobs or where fresh corn kernels are cut from the cob and packaged.

The desired portion of the fresh corn, the kernels, comprise approximately 25% to 30% by weight of the total fresh corn harvested in the field. The waste portion, the shucks and cobs, comprise approximately 70% of the weight. Because conventional canneries may be many miles from the field in which the corn is grown, the unprocessed raw corn must be transported from the field to the cannery. As a result, 70 to 75 percent (when processing only the corn kernels) of the hauling charges incurred are attributable to the transportation costs of the waste cobs and shucks. Moreover, additional hauling charges will be incurred for transporting the waste away from the cannery.

Additionally, there are numerous canneries located in agricultural areas that are capable of freezing and/or canning fresh produce; however, there are substantially fewer canneries that contain equipment that is capable of husking, slicing cobs and cutting the kernels corn from the cob. Transportation expenses and the need to minimize transport time restrict the potential growing area for fresh green corn to geographic areas in general proximity to canneries with husking, slicing and cutting capabilities.

The present invention provides an efficient means to process corn at the harvest site in preparation for packaging, to reduce the costs associated with transporting the corn to a cannery and to expand the potential growing areas for fresh green corn.

SUMMARY OF THE INVENTION

The present invention comprises a self-contained mobile fresh corn processing system that may be transported in proximity to the field in which the corn is grown. In the present invention, raw ears of unhusked corn are received by a hopper which continuously feeds the ears of corn into a first processing trailer. The first processing trailer holds the ears and disburses them onto a first conveyer. The first conveyer feeds the raw ears of corn into a husker where the corn husks and silks are removed. The ears are then transported via a conveyer to a second trailer for further processing.

Upon entrance to the second trailer, the corn ears can be selectively separated into two groups. The first group of ears can be directed to a mechanism to slice the cobs into "mini" cobs for packaging "corn-on-the-cob" while the second group of ears can be directed to cutting mechanisms to remove the corn kernels from the cobs. The slicing and cutting functions can be performed simultaneously or separately, depending on the product demand. Further, the step of selectively separating the cobs into multiple groups can be manually or automatically performed. The corn husks, silk, cob and stalks are removed from the first and second trailers to a trash trailer by a series of trash conveyer belts. These trash particles can be used for fertilizer or stored as silage.

The sliced or mini-cobs are transported via a conveyer from the second processing trailer to transportation totes where the cobs are transported to a cannery for packaging. The cut kernels are cleaned and chilled in a third processing trailer and finally directed to transportation totes for delivery to a cannery for packaging.

The present system presents advantages over conventional systems because the geographic growing area for fresh corn is substantially expanded. In the present invention, the husking, cutting and slicing functions are accomplished in proximity to the field in which the corn is grown; therefore, conventional canneries may be used for final processing of the output product from the present invention. As noted in the background section, there are numerous canning facilities located in agricultural areas; however, only a limited number of those include the capability for husking, cutting kernels, and slicing cobs. By expanding the number of canneries capable of processing the corn, the area for growing fresh corn is increased.

BRIEF DESCRIPTION OF THE DRAWINGS

A more complete understanding of the invention may be had by reference to the following Detailed Description when taken in conjunction with the accompanying drawings in which.

DETAILED DESCRIPTION

Figure 1:
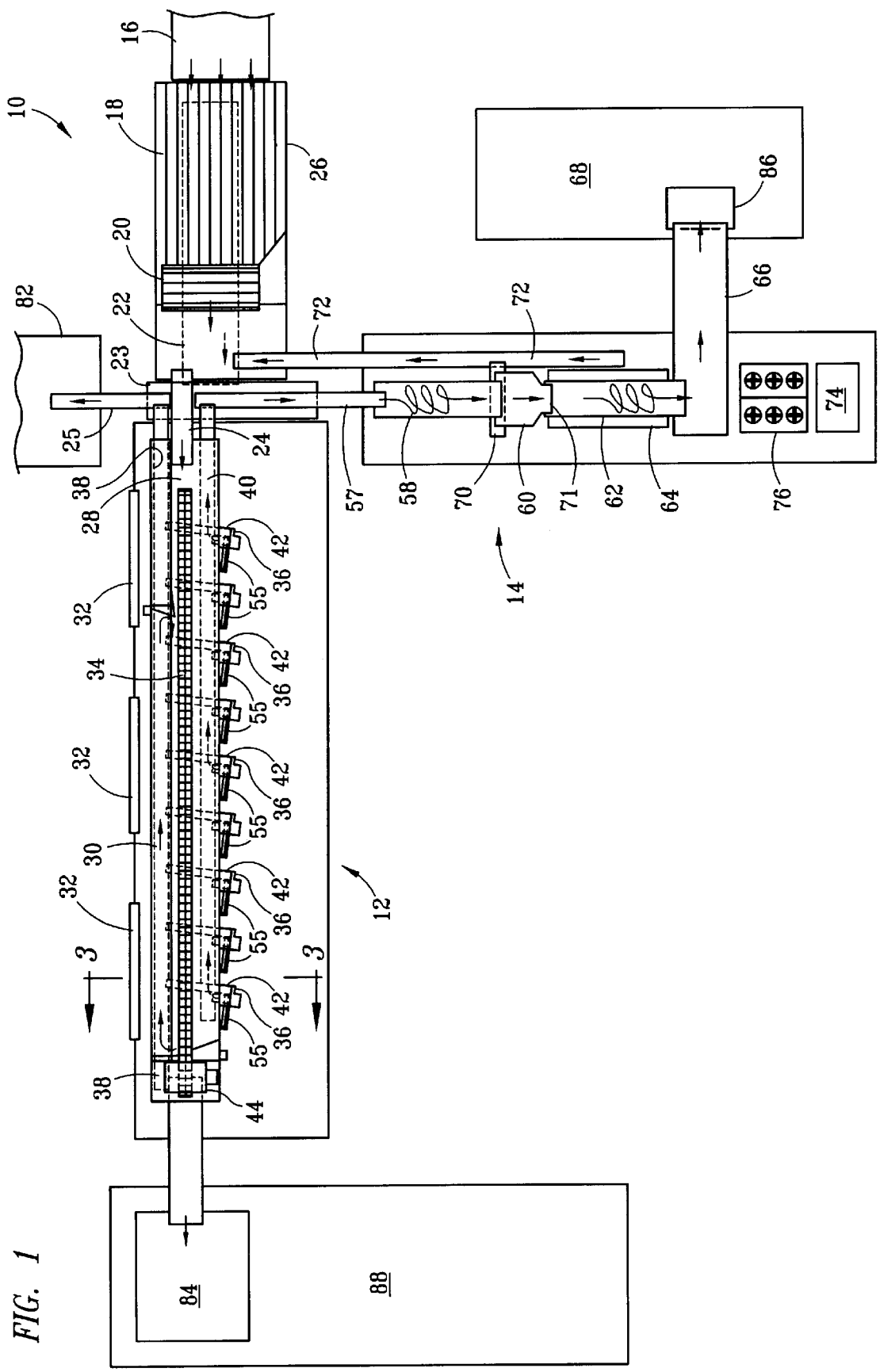
FIG. 1 is a plan view of the self-contained mobile corn processing system of the present invention.

Reference is now made to the Drawings wherein like reference characters denote like or similar parts throughout the four Figures. The present invention comprises a self-contained mobile fresh corn processing system that may be transported in proximity to the field in which the corn is grown. Referring to FIG. 1, the system includes three self-contained movable semi-trailers 10, 12 and 14 such as are typically manufactured and conventionally used to transport goods on the highways, wherein corn processing equipment is contained inside or thereon the semi-trailers. First trailer 10 comprises a storage area 26 and husker 20 to remove the corn silks and husks. Second trailer 12 contains multiple corn cutters 36, wherein the ears are processed to strip the kernels from the cob, and a saw housing 44, where fresh corn ears are cut into mini corn cobs in preparation for packaging. Third trailer 14 comprises a first sieve 58, a cooling water tank 60, a second sieve 62, and chiller 76, all operable to wash and cool the cut corn kernels. Power supply 74, also located on trailer 14, provides power to the corn processing equipment. The corn processing equipment is conventional equipment similar to that located in fixed canneries; however, the equipment has been modified so as to be self-contained in the mobile trailers.

The first trailer 10 receives fresh unhusked corn from a harvester (not shown). The harvester may be any conventional corn harvester that strips the ears of unhusked corn from the stalk and discards the stalk. Corn is preferably fed into the first trailer 10 from hopper 16, whereby the flow of corn into storage area 26 can be continuous and easily regulated. Hopper 16 is a conventional type hopper capable of holding approximately 2000 pounds of corn ears. Corn may be fed into the hopper 16 directly from the harvester or alternatively from a transportation buggy filled by the harvester in the field. Hopper 16 directs ears of corn into storage area 26 of trailer 10 and provides distinct advantages in that the rear doors to storage area 26 are not required to be opened each time corn is loaded into storage area 26. Thus, cobs will not fall from first trailer 10 when the storage container's doors are opened and trailer 10 can be continually fed. In an alternative embodiment, the first trailer 10 can be fed directly from the harvester's dump box or from the transportation buggy that is filled by the harvester in the field without using hopper 16.

The trailer storage area 26 functions as a holding bin with a vibrating floor 18 (commonly known in the trade as a walking floor). Floor 18 feeds the unhusked corn to a cleated first conveyer (not shown) that transports the corn to husker 20, where the corn is further processed. Power source 74, located on the third trailer 14, directs power to a motor (not shown) to operate a bidirectional hydraulic pump (not shown), which moves floor 18.

Husker 20 removes the corn shucks and corn silks by counter-rotating rubber grip rollers. The components of the husker 20 are conventional equipment well known to those skilled in the art, and of the type manufactured by CCM, Hughes, or FMC. After the husker processes the corn, the shucks and waste cob are carried by a trash conveyer belt 22 (located under first trailer 10) to a main trash conveyer 23 and inclined cleated conveyer 25, which deposits the waste inside trash container or trailer 82. The waste cobs and shucks may be returned to the fields and plowed under as fertilizer or transported to storage and used for silage.

The husked ears of corn are transported from husker 20 to trailer 12 via conveyer 24 to feed the ears of corn onto belt 28. Belt 28 directs the ears inside trailer 12 where the husked ears are visually inspected for any ears that are unsatisfactory for processing. Unsatisfactory ears include those not fully developed, short ears or those that are not desirable for human consumption. After visual inspection, the ears are selectively separated into two groups. A first group of ears is directed onto conveyer 34, which transports the ears toward saw housing 44 for subsequent cutting of ears into smaller cobs. A second group of ears is directed toward multiple corn cutters 36, where the kernels are stripped from the cob. Any ears that proceed to the end of belt 28 that are not processed in either the first or second group are re-circulated back to belt 28 by return belt 30.

The separation into the first and second groups depends on cob length and diameter. Cobs that have longer lengths and larger diameters are selected and included in the first group for processing as corn-on-the-cob. The larger "coblets" are preferable as in most cases the ear can be sliced into two equal sized portions. Cobs that are shorter in length and smaller in diameter are better suited for processing as corn kernels as in some cases the shorter length prevents the cob from being cut into normal or desired portions.

Figure 2:
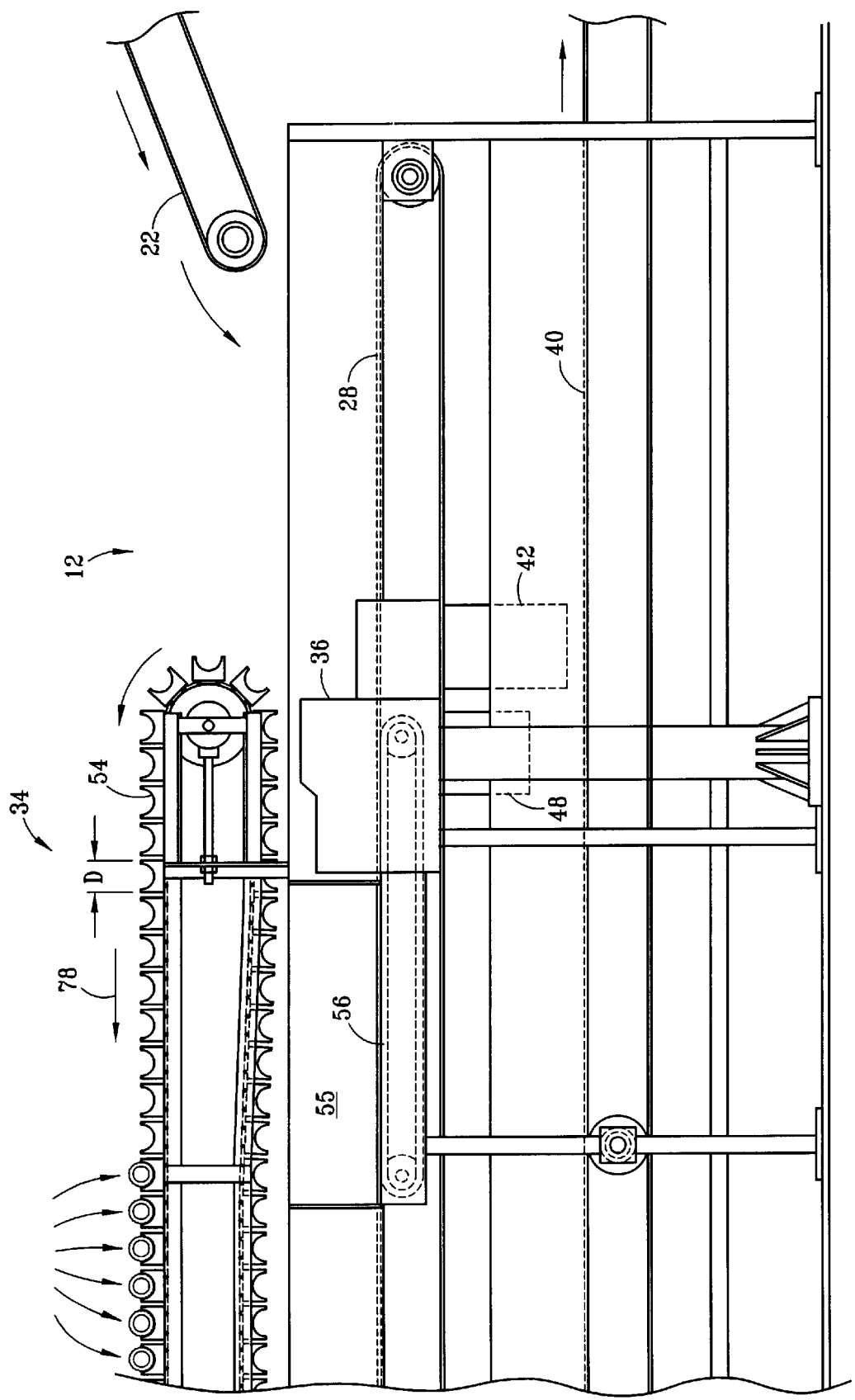
FIG. 2 is an elevation view of a portion of FIG. 1 illustrating the cob conveyer and entrance area where a cobs enter into second trailer.

As seen in FIG. 2, cobs enter trailer 12 via conveyer 24, which deposits the corn ears on feed conveyer 28. Processing the first group of ears begins by operators taking the corn ears from feed conveyer 28 and placing them onto conveyor 34 as it moves in feed direction 78. Any unsatisfactory cobs are removed from belt 28 and routed for trash. Normal operation requires three operators to direct the corn on the conveyer; however, a greater or fewer number of operators can be used depending on the output desired. In the preferred embodiment, operators stand outside trailer 12 on scaffolding (not shown) and reach through window openings 32 (FIG. 1) to visually inspect and place satisfactory cobs from belt 28 onto conveyer 34 as they move toward saw housing 44 (FIG. 1).

Figure 3:
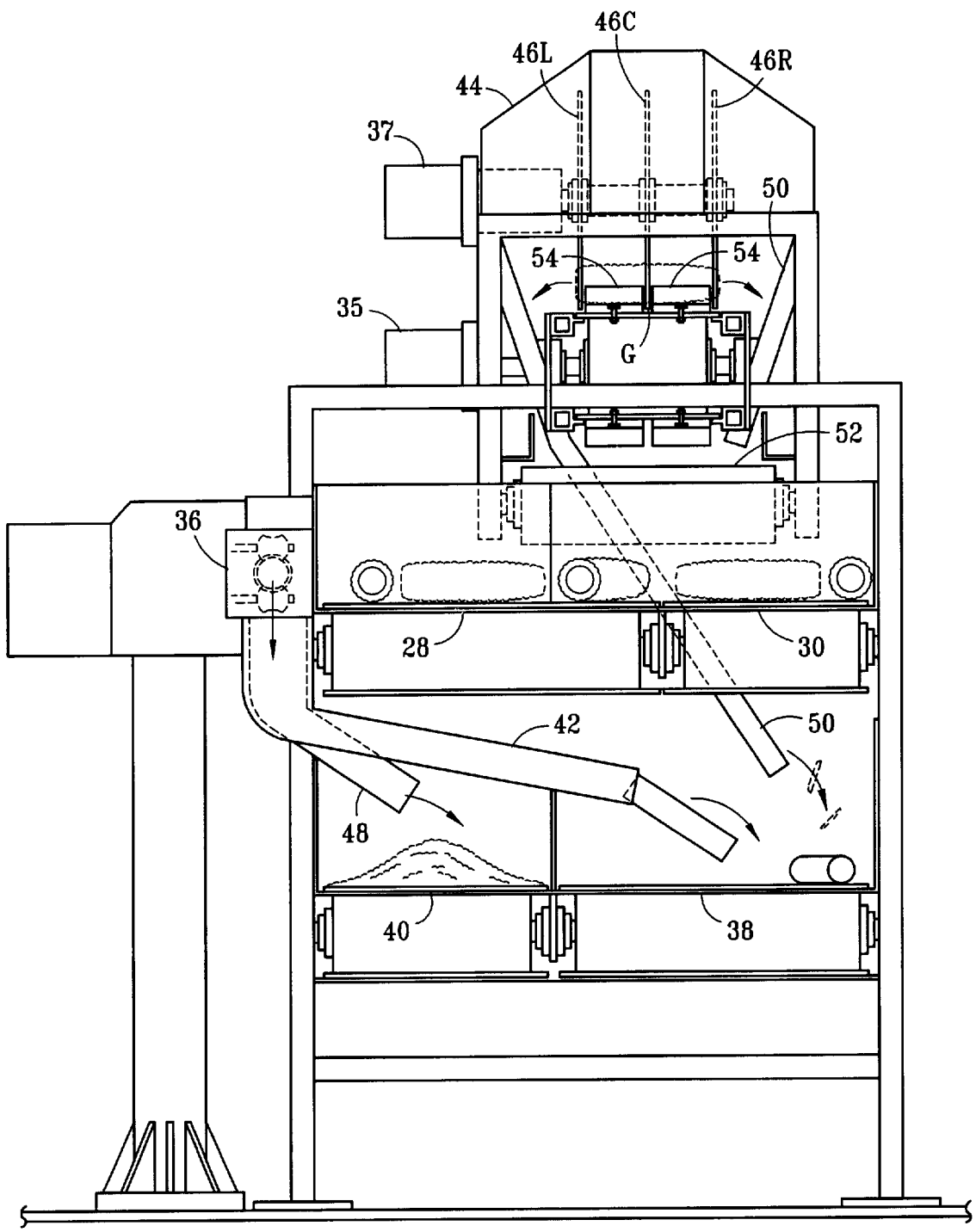
FIG. 3 is a section view taken along line 3—3 of FIG. 1.

Conveyer 34 comprises multiple "U" shaped cups 54 located above and parallel to feed conveyer 28 and are designed to receive and support the ears of corn. Cups 54 can be plastic, metal or any other suitable material capable of supporting the ears of corn. Referring to FIGS. 2 and 3, as the corn cobs are placed onto conveyer 34, they are supported by a pair of spaced apart and coaxially aligned cups 54 (best seen in FIG. 3). Cups 54 have a diameter D slightly larger than the diameter of a husked corn cob and the pair of cups 54, when coaxially aligned, have a length shorter than that of a fully developed ear. This shorter cup length allows the cob ends to be sawed off to remove any remaining portion of the stalk and to provide a flat end. Further, the gap G between cups 54 provides a slot to allow saw 46C to slice the cob into smaller portions (FIG. 3). Conveyer 34 is driven by a conventional type electrical motor 35 with adjustable speed capabilities. Power is supplied to the motor by remote power source 74 located on third trailer 14 (FIG. 1).

FIG. 3 illustrates the cobs being processed inside saw housing 44. Three circular saw blades 46L, 46C and 46R are rotated by motor 37 so that they continuously rotate as cups 54 transport the cobs through saw housing 44. As explained earlier, when the cobs are processed through saw housing 44, they are sliced in the radial direction, perpendicular to the length of the cob, into smaller portions by saw 46C, which slices the middle portion of the cob. In addition to slicing the middle portion of the cob, the end portions are removed by blades 46L and 46R to discard any portion of the corn stalk that may remain on the cob and provide a smooth end. The cob ends fall downward and are directed toward trash belt 38 by deflectors 50. The ends are removed from trailer 12 via conveyer 38 for storage in trash trailer 82.

Figure 4:
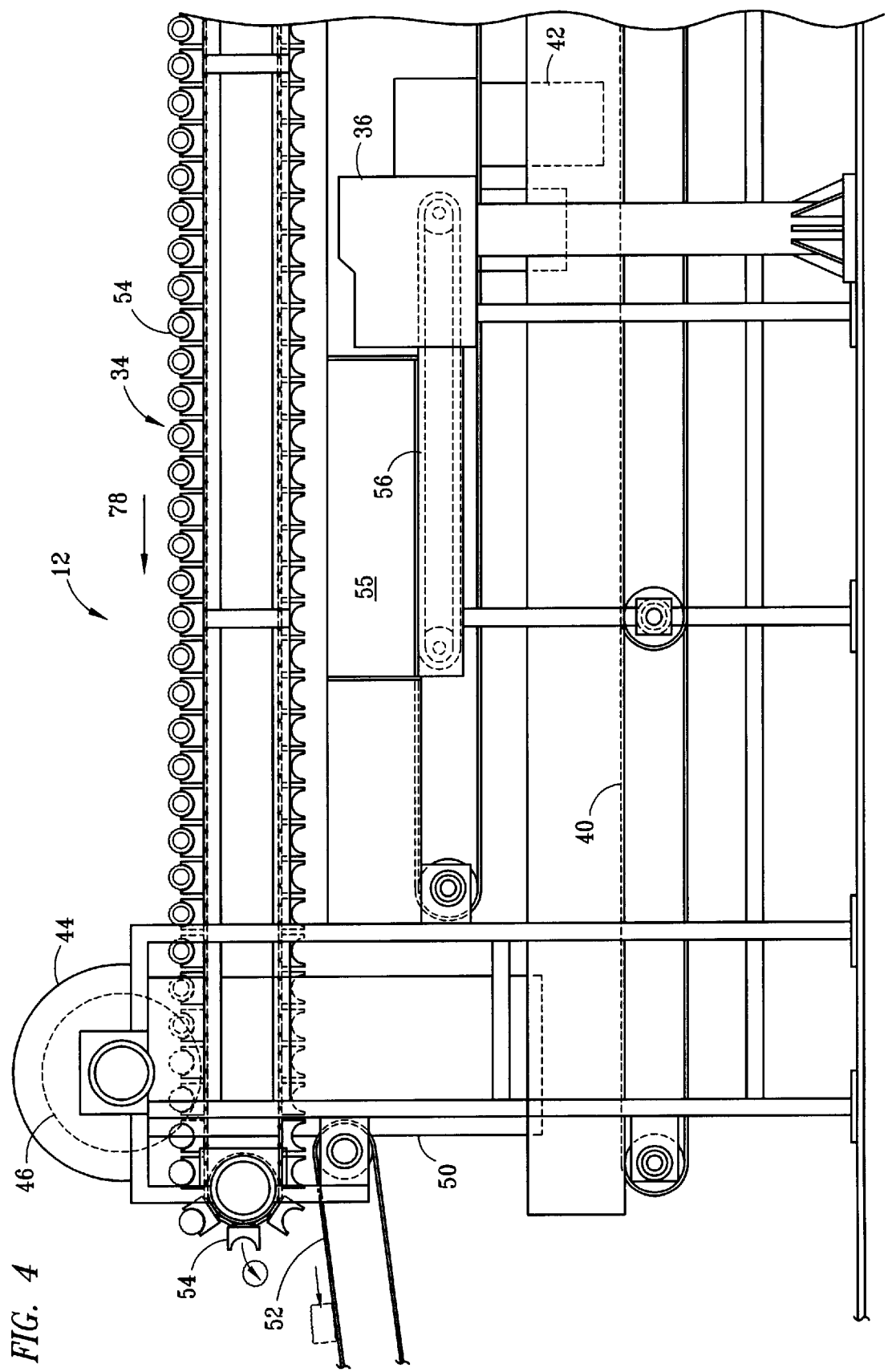
FIG. 4 is an elevation view of a portion of FIG. 1 illustrating the cob conveyer and saw.

Referring to FIG. 4, after the cobs have been sliced, cups 54 carry the cobs away from saw housing 44 and drop the cobs onto transportation conveyer belt 52. The cobs on conveyer belt 52 travel from trailer 12 to a lined container 84 (See FIG. 1) which can be stored on a flatbed trailer 88 for transporting the cobs. Container 84 contains a polyethyl liner and holds approximately 1000 pounds of cobs and are transported to a cannery for further processing. During normal operation, 6 containers (6000 pounds of corn cobs) can be filled per hour. The empty cups 54 on conveyer 34 continue in return direction 80 where they are eventually re-filled with ears of corn at the opposite end of the trailer.

Referring back to FIG. 1, when processing the second group, cobs are manually removed from feed conveyor 28 by operators standing adjacent cutting machines 36. Trailer 12 comprises nine cutting machines 36 to receive the fresh ears of corn for processing. Each cutting machine can cut up to approximately 100–110 ears per minute. Referring to FIG. 2, Operators visually inspect and remove the satisfactory ears from conveyer 28 and place them in feed chutes 55 with the point end forward. The oriented corn is carried by an intake chain 56 to cutter mechanism 36 wherein a plurality of mechanical knives (not shown) follow the contours of the cob and remove the kernels from the cob in a longitudinal direction along the length of the cob. As seen in FIG. 3, a kernel chute 48 directs the kernels to a white PVC (food grade) kernel conveyor belt 40 for transporting the cut kernels to the rear of the trailer 12. Cobs from the cutter 36 are released and directed from the cutter to trash belt 38 by chute 42. The spent cobs are conveyed via trash belt 38 to the rear of second trailer 12 and then via conveyers 23 and 25 to trash trailer 82 (FIG. 1).

The separation the first and second groups can be performed by manual labor, whereby human operators direct the ears to the desired location as discussed above, or, in the alternative, separation can be performed automatically so that human operators are not required. In either case, the cobs are selectively placed onto the cob conveyor or into the corn cutter machine so that the lines are operating simultaneously or individually, whichever may be desired.

Automation can be performed by directing the cobs to a chamber or slot whereby the cobs can be weighed, imaged, optically scanned or examined by any other method capable of determining the characteristics of the cob (i.e., size, weight, color, etc.). This data can be analyzed to determine whether the cob is better suited for processing in the first group as "corn-on-the-cob" or if it is better suited for processing with the second group as cut corn kernels. In either case, after analysis has been performed, the cob can be directed toward the desired processing area.

Referring now to third trailer 14 in FIG. 1, corn kernels are delivered from trailer 12 by conveyor 57 for cleaning and cooling. Kernels are first directed inside rotating sieve 58. Sieve 58 is a metal cylindrical container having a mesh diameter slightly larger than the diameter of a corn kernel. Chilled water is sprayed inside rotating sieve 58 to rinse and chill the kernels. As the corn is rotated by sieve 58, the kernels are sifted through the mesh and fall onto a water filled tray (not shown) located below sieve 58. The kernels slide down the tray into tank 60, where they are further washed and cooled. Trash particles too large to pass through the mesh screen exit the opposite end of sieve 58 end and fall onto trash belt 70, where the particles are directed to trash conveyor 72 for transportation from trailer 14. Cooling tank 60, which circulates chilled water, cools the corn to approximately 38–40 degrees Fahrenheit. Corn kernels are then pushed up a ramp onto second tray 71 from the bottom of tank 60 by high pressure water. Kernels flow down second tray 71 into a second rotating sieve 62 to drain any excess water that may remain on the corn kernels. Holding tank 64, located directly below rotating sieve 62, stores the excess water and directs the water for re-circulation.

The kernels exit the opposite end of rotating sieve 62 onto conveyor 66, a food grade PVC conveyor. The kernels are transported via conveyor belt 66 to a transportation tote 86 located in loading trailer 68. Transportation totes 86 may be any sanitary containers capable of bulk transportation of approximately 1500 to 1700 pounds of the kernel corn and juice. Typical containers may be stackable polymeric or stainless containers with suitable sealing lids or corrugated crates with plastic liners. The transportation totes 86 are loaded onto conventional tractor trailers and delivered to a cannery for further processing. If a cannery is not nearby, refrigerated tractor trailers may be used to transport the transportation totes 86 containing the kernel corn to more distant canneries. The refrigerated trailers transport the kernel corn at about 28 degrees to 30 degrees Fahrenheit. As noted in the Background and Summary of the Invention sections of this application, chilling of the corn and refrigerated transportation provide distinct advantages over prior art systems for processing kernel corn.

The cooling water is inspected and changed as needed for maintenance of sanitary conditions. Generally, the cooling water is changed at least daily. The cooling water is chilled by a conventional chiller 76 comprising a heat exchanger and compressor/condenser mounted on the front portion of the third trailer 14.

Power is supplied to the various components by power supply 74, most preferably a 250 horsepower engine mounted on third trailer 14.

Although preferred embodiments of the present invention have been illustrated in the accompanying Drawings and described in the foregoing Detailed Description, it will be understood that the invention is not limited to the embodiments disclosed but is capable of numerous rearrangements, modifications, and substitutions of parts and elements without departing from the spirit of the invention. Such modifications may include, but are not limited to, the use of two or more husking and cutting trailers to increase the inlet kernel corn to the cooling trailer. Alternatively, if the harvesting area is located very near a cannery, the raw kernel corn may be processed as taught herein and transported in bulk containers without the chilling steps.

I claim:

1. A method for selectively producing clean corn kernels and cut corn cobs from raw unhusked ears of corn at or near the harvest site, including:

receiving raw unhusked ears of corn into a mobile processing apparatus;

mechanically removing corn husks and silks from the ears within said mobile processing apparatus;

discharging corn husks and silks from said mobile processing apparatus;

selectively directing a first group of ears towards saws and a second group of ears towards cutters after the husks and silks are removed;

cutting said first group of ears in a radial direction to remove corn stalks from the cob and to cut the cob into smaller cob portions, and further including discharging corn stalks from said mobile processing apparatus and filling receptacles with the cut cobs for transport; and cutting said second group of ears in a longitudinal direction to remove kernels from the cob within said mobile processing apparatus, and further including:

discharging the corn cobs from said mobile processing apparatus;

washing the kernels within said mobile processing apparatus;

chilling the kernels within said mobile processing apparatus; and filling receptacles with the chilled kernels for transporting.

2. The method of claim 1, wherein the kernels are chilled to a temperature below about 40 degrees Fahrenheit.

3. A method for selectively producing clean corn kernels and cut corn cobs from raw unhusked ears of corn at or near the harvest site, including:

receiving raw unhusked ears of corn into a first trailer wherein the raw unhusked ears of corn are processed by mechanically removing corn husks and silks from the ears;

transporting the corn husks and silks via a first conveyor to a second trailer wherein processing in said second trailer includes selectively directing a first group of ears towards saws and a second group of ears towards cutters;

cutting said first group of ears in a radial direction to remove corn stalks from the cob and to cut the cob into smaller cob portions within said second trailer, discharging the corn stalks from said second trailer via a second conveyer and transporting the cut cobs to a filling receptacle where cobs are placed for transporting;

cutting said second group of ears in a longitudinal direction to remove kernels from the cob within said second trailer, discharging the cobs from said second trailer via a third conveyer and transporting the cut kernels via a fourth conveyer to a third trailer;

washing, chilling and drying the corn kernels in said third trailer; and transporting the corn kernels to fill transportation receptacles via a fifth conveyer for transportation.

4. The method of claim 3, wherein the kernels are chilled to a temperature below about 40 degrees Fahrenheit.

5. The method of claim 3, wherein the washing and chilling of the kernels includes spraying chilled water over kernels in a rotating cylindrical sieve to separate trash particulate from the corn kernels.

6. The method of claim 5, wherein the chilling of the kernels further includes chilling in a cooling tank.

7. The method of claim 6, wherein the cooling tank chills the kernels to a temperature below about 40 degrees Fahrenheit and high pressure water moves the kernels from the cooling tank.

8. The method of claim 3, wherein the drying of the kernels includes placing the kernels in a rotating cylindrical sieve to drain chilled water and placing the kernels on a fifth conveyer to further drain the chilled water.

9. The method of claim 3, wherein said transportation receptacles are filled with about 1500–1700 pounds of the chilled kernels.

10. The method of claim 3, wherein one or more hoppers feed the raw unhusked ears of corn into said first trailer.

11. The method of claim 3, wherein said first trailer receives raw ears directly from a transportation vehicle previously loaded by a corn stripper.

12. The method of claim 3, wherein said first trailer receives raw ears directly from a corn stripper which harvests corn in fields.

13. The method of claim 3, wherein said first trailer, second trailer, and third trailer are mobile.

14. A method for selectively producing clean corn kernels and cut corn cobs from raw unhusked ears of corn at or near the harvest site, including:

receiving raw unhusked ears of corn into a mobile processing apparatus;

mechanically removing corn husks and silks from said ears within the mobile processing apparatus;

discharging corn husks and silks from the mobile processing apparatus;

selectively directing a first group of ears towards saws and a second group of ears towards cutters after the husks and silks are removed;

cutting said first group of ears in a radial direction to remove corn stalks from the cob and to cut the cob into smaller cob portions, further including discharging corn stalks from said mobile processing apparatus; and cutting said second group of ears in a longitudinal direction to remove kernels from the cob within the mobile processing apparatus, further including discharging the cobs from said mobile processing apparatus.

15. The method of claim 14, wherein the kernels are washed and dried within said mobile processing apparatus.

16. The method of claim 15, wherein the kernels are chilled within said mobile processing apparatus.

17. The method of claim 16, wherein the kernels are chilled to a temperature below about 40 degrees Fahrenheit.

18. The method of claim 14, wherein the smaller cob portions are directed to a filling receptacle for transporting.

19. The method of claim 14, wherein the kernels are directed to a second filling receptacle for transporting.

20. A mobile system for selectively producing clean corn kernels and cut corn cobs from raw unhusked ears of corn at or near the harvest site comprising:

a corn holding bin to receive the raw unhusked ears of corn in a mobile processing apparatus;

a husking mechanism for removing corn husks and corn silks from said ears within said mobile processing apparatus;

a directing mechanism for selectively directing a first group of ears towards saws and a second group of ears towards cutters after the husks and silks are removed within said mobile processing apparatus;

a mechanism to radially cut cobs from said first group of ears received from said husking mechanism within said mobile processing apparatus;

a mechanism to remove kernels from said second group of ears received from said directing mechanism within said mobile processing apparatus, further including:
a mechanism to wash said kernels from said second group of ears;
a mechanism to chill said kernels from said second group of ears;
at least one receptacle for holding the cut cobs for transportation; and
at least once receptacle for holding the washed and chilled kernels for transportation.

21. The mobile system of claim 20, wherein the chilling mechanism includes a heat exchanger and condenser/compressor for cooling a fluid that is circulated through a cooling tank.

22. The mobile system of claim 20, wherein the corn holding bin includes a moveable floor to evenly distribute the raw unhusked ears of corn to said husking mechanism.

23. The mobile system of claim 20, further including a self-contained power source.

24. A mobile system for selectively producing clean corn kernels and cut corn cobs from raw ears of corn at or near the harvest site comprising:

a husking mechanism for removing corn husks and corn silk from said ears within a mobile processing apparatus;

a directing mechanism for selectively directing a first group of ears towards saws and a second group of ears towards cutters after the husks and silk are removed within said mobile processing apparatus;

a mechanism to radially cut cobs from said first group of ears received from said husking mechanism within said mobile processing apparatus;

a mechanism to remove kernels from said second group of ears received from said directing mechanism within said mobile processing apparatus;

a mechanism to wash the kernels from said second group of ears within said mobile processing apparatus; and a mechanism to chill the kernels from said first group of ears within said mobile processing apparatus.

25. A method for producing clean corn from raw unhusked ears of corn at or near the harvest site including:

receiving the raw unhusked ears of corn into a mobile processing apparatus;

mechanically removing corn husks and silks from said ears within said mobile processing apparatus to produce corn cobs;

discharging said corn husks and said silks from said mobile processing apparatus;

directing said cobs toward saws and sawing said cobs in a radial direction to remove corn stalks from said cob and to cut said cob into smaller cob portions, further including discharging said stalks from said mobile processing apparatus.

26. The method of claim 25, further including simultaneously directing a second group of cobs toward cutters after said husks and said silks are removed, wherein said second group of cobs are cut in a longitudinal direction to remove kernels from said cob within the mobile processing apparatus, further including discharging the cobs from said mobile processing apparatus.

27. The method of claim 26, wherein said kernels are washed and dried within said mobile processing apparatus.

28. The method of claim 27, wherein said kernels are chilled within said mobile processing apparatus.

29. The method of claim 28, wherein said kernels are chilled to a temperature below about 40 degrees Fahrenheit.

30. The method of claim 25, wherein said smaller cob portions are directed to a filling receptacle for transporting.

31. The method of claim 29, wherein said kernels are directed to a second filling receptacle for transporting.

32. A mobile system for producing clean corn from raw unhusked ears of corn at or near the harvest site comprising:

a husking mechanism for removing corn husks and corn silks from said ears within a mobile processing apparatus to produce corn cobs;

a mechanism to radially cut said cobs into smaller cob portions within said mobile processing apparatus; and a directing mechanism for directing a group of cobs to be cut into the smaller cob portions towards the cutting mechanism after said husks and said silks are removed within said mobile processing apparatus.

33. The mobile processing apparatus of claim 32 wherein said directing mechanism simultaneously directs a second group of cobs towards cutters after said husks and said silk are removed within said mobile processing apparatus, further comprising:

a mechanism to remove kernels from said second group of cobs received from said directing mechanism within said mobile processing apparatus;

a mechanism to wash said kernels from said second group of ears within said mobile processing apparatus; and a mechanism to chill said kernels from said second group of ears within said mobile processing apparatus.

34. The mobile system of claim 33, wherein said chilling mechanism includes a heat exchanger and condenser/compressor for cooling a fluid that is circulated through a cooling tank.

35. The mobile system of claim 34 further including a self-contained power source.

* * * * *